July 9, 1940.  R. F. LANE ET AL  2,206,903
RADIANT ENERGY DISTANCE MEASURING SYSTEM
Filed Nov. 16, 1938  3 Sheets-Sheet 1
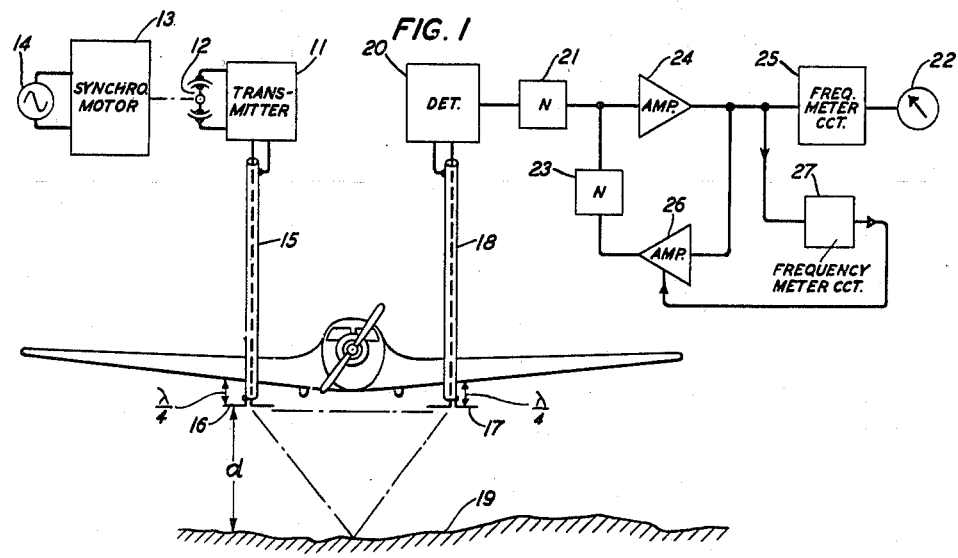
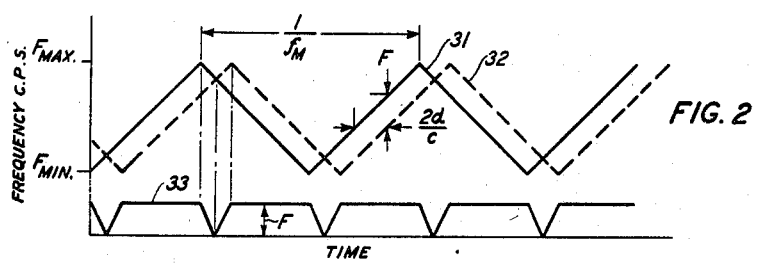
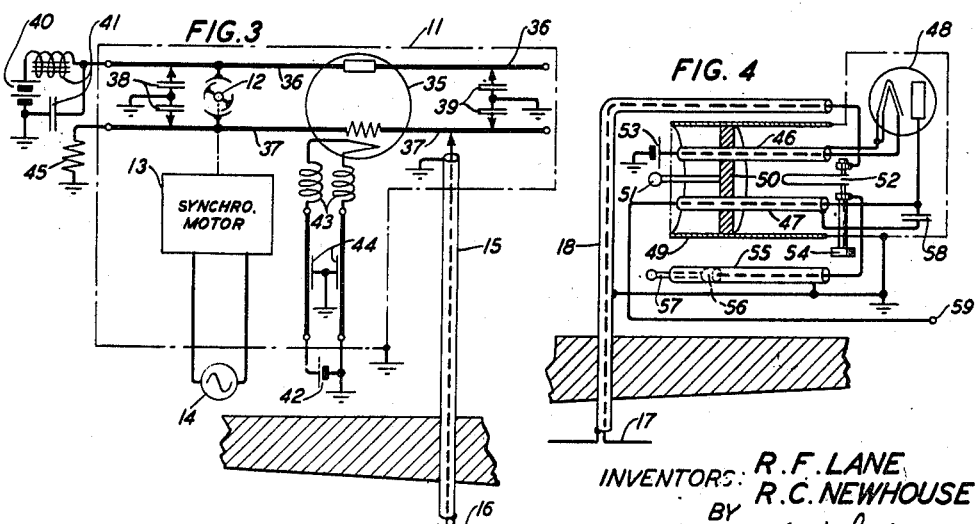
INVENTORS: R. F. LANE
R. C. NEWHOUSE
BY E. V. Griggs
ATTORNEY

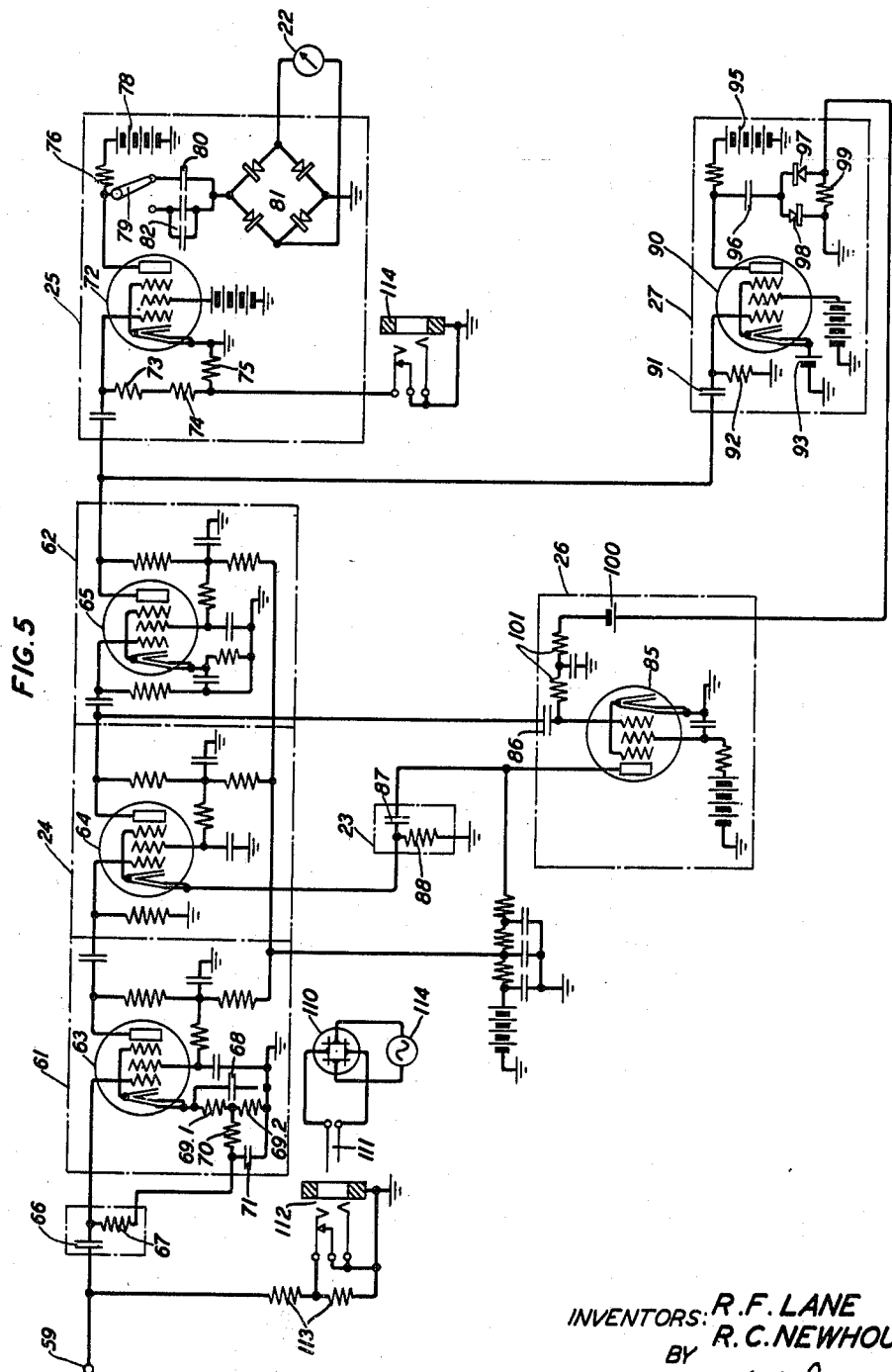

Patented July 9, 1940

2,206,903

UNITED STATES PATENT OFFICE 2,206,903

RADIANT ENERGY DISTANCE MEASURING SYSTEM

Richard F. Lane, South Orange, and Russell C. Newhouse, Orange, N. J., assignors to Bell Telephone Laboratories, Incorporated, New York, N. Y., a corporation of New York Application November 16, 1938, Serial No. 240,738

8 Claims. (Cl. 250—1)

This invention relates to systems for measuring distances by the use of radiant energy and particularly to such systems as adapted for use as altimeters or terrain clearance indicators for aircraft.

An object of the invention is to provide an accurate and reliable radiant energy distance measuring system.

In accordance with this invention distance is measured by radiating waves from one point to another and receiving the waves reflected back at the first point. The time interval between radiation and reception is a measure of the distance and is determined by cyclically varying the frequency of the transmitted waves at a known rate and over a known range. The frequency difference between the wave being transmitted and the received reflected wave is therefore a measure of the distance to the reflecting surface. The measurements are obtained by beating together the transmitted wave and the echo wave and measuring the frequency of the resultant difference frequency beat wave.

As a result much of the accuracy of the system is dependent upon the accuracy of the frequency measurement. This is true not only with respect to the absolute measurement of the beat frequency wave but also with respect to the elimination from that measurement of the effect of currents of spurious frequencies. Such currents arise not only from such usual causes as circuit noise vibration, power supply variations, harmonic production and the like but also from causes peculiar to the system itself. Thus amplitude modulations of the echo may be produced by variations in the reflecting power of the terrain or interference between component echoes from adjacent surfaces of different heights. Unless precautions are taken to eliminate such spurious frequencies, quite false and deceiving indications will be obtained.

These and other problems and the method of their solution in accordance with this invention may be more fully understood by reference to the following detailed description in connection with the drawings, in which:

Fig. 1 is a block schematic drawing of a complete system in accordance with the invention;

Fig. 2 is an explanatory diagram of the operation of the system of Fig. 1;

Fig. 3 is a detailed schematic drawing of the transmitter portion of the system;

Fig. 4 is a detailed schematic of the detector of the receiver portion of the system;

Fig. 5 is a detailed schematic of the amplifier and frequency measuring portion of the receiver;

Figure 6:
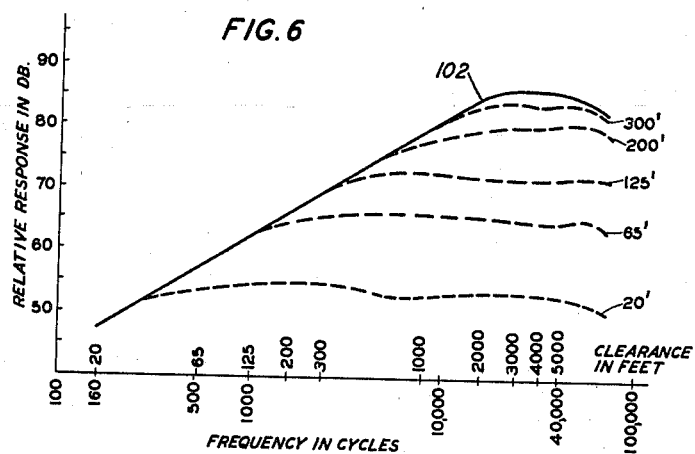
Fig. 6 is an explanatory diagram of the operation of the amplifier system of Fig. 5.

Fig. 1 shows a block schematic of one embodiment of the invention. This system comprises an ultra short wave radio transmitter 11 equipped with a rotating condenser 12 driven by a synchronous motor 13 for continuously varying the frequency of the transmitter. The output of the transmitter is connected through a coaxial transmission line 15 to a half wave dipole antenna 16 which is mounted a quarter wave-length below the metal surface of the wing of the airplane, which acts as a reflector.

A second similar half wave dipole antenna 17, mounted in axial alignment with the antenna 16 is connected through a concentric transmission line 18 to a detector 20. As indicated in the diagram the waves generated by the transmitter 11 and radiated by the antenna 16 will be directly transmitted to the antenna 17 and also transmitted thereto by reflection from the surface of the earth 19 or other objects the distance of which it is desired to measure. The directly transmitted and reflected signal components are applied to the detector 20 where they combine to produce a useful demodulation product which is a signal whose instantaneous frequency is equal to the instantaneous difference in the frequency of the two component waves. This difference frequency product is amplified and its frequency is measured and indicated by the frequency meter circuit 25 of the integrating type, and the meter 22. The average value of the frequency difference is a direct measure of the altitude, that is the distance $d$ between the measuring apparatus and the reflecting surface 19.

The circuit for amplifying the frequency difference product includes the equalizing or attenuating networks 21 and amplifier 24 which is provided with an inverse feedback circuit including amplifier 26 and attenuation network 23. The feedback amplifier 26 is provided with a control through an auxiliary frequency meter circuit 27. The operation and function of these various amplifier and control circuits will be described in detail in connection with Fig. 5 which is a detailed circuit schematic thereof.

General principles of operation

The fundamental principles of the system as discussed in more detail in the copending application of R. C. Newhouse, Serial No. 240,739, filed November 16, 1938, concurrently herewith, may be understood by reference to the explanatory diagram of Fig. 2 in connection with Fig. 1. In this diagram, Fig. 2, instantaneous frequencies in cycles per second are plotted as ordinates against time in seconds as abscissa. The frequency of the ultra high frequency transmitter is periodically varied about ±2.5 per cent between the extremes $F_{min.}$ and $F_{max.}$, as indicated by the solid line curve 31. This frequency variation is produced by means of the frequency modulating condenser 12 which is rotated at a constant speed by the synchronous motor 13. The instantaneous frequency of the transmitted signal will therefore vary with time approximately as shown by the saw-toothed shaped solid line 31. This signal is radiated by the antenna 16 located below the lower surface of the airplane. The receiving antenna 17 is similarly located and receives the signal both directly from the transmitting antenna and after reflection from the earth's surface 19 as shown by the dash-dot line of Fig. 1. Since under normal operating conditions the distance to the earth and back is greater than the distance between the antennae, the reflected signals will arrive at the receiving antenna at a later time than the direct signal. This time difference in travel assuming that the height of the craft above the earth is large compared with the distance between the antennae, is, for all practical purposes, $$\frac{2d}{c}$$

where $d$ is the height of the craft above the earth's surface and $c$ is the speed of light (186,000 miles per second).

In Fig. 2 this reflected signal is represented by the dotted curve 32 displaced to the right from the curve 31, representing the direct signal, by the time $$\frac{2d}{c}$$

since it arrives at the receiver that much later than the direct signal. Examination of the curves 31 and 32 of Fig. 2 will show that under these circumstances a frequency difference F exists between the direct and reflected signals. This difference is constant for a given airplane height $d$ except at certain instances near the points represented by the cross-over of the curves 31 and 32. At these particular instances the direct and reflected signals are momentarily of the same frequency. The number of cycles of frequency modulation $F_M$ is so chosen that $$\frac{2d}{c}$$

is always very small compared to $$\frac{1}{2F_M}$$

Under these circumstances the average difference F is directly proportional to the height $d$ and is given by the following equation:

$$F_{av.} = 4(F_{max.} - F_{min.})F_M \frac{d}{c} \quad (1)$$

where

- $F_{av.}$ = the average output frequency of the radio receiver in cycles per second.
- $F_{max.}$ = the maximum instantaneous radio transmitter frequency in megacycles.
- $F_{min.}$ = the minimum instantaneous transmitter frequency in megacycles.
- $F_M$ = the number of times per second that the transmitter frequency is varied over the cycle from $F_{max.}$ to $F_{min.}$ and back again.
- $d$ = the altitude or accurately the altitude minus one half the separation between antennas.
- $c$ = the velocity of propagation.

The curve 33 shows the instaneous variation of the frequency difference F with time.

With the proper choice of constants the average frequency difference $F_{av.}$ can be made to fall within the frequency spectrum from 160 to 40,000 cycles per second for heights from 20 to 5,000 feet.

While the curves show the transmitter frequency varying linearly with time, this is not essential to the operation of the system.

Radio transmitter

A detailed schematic of the radio transmitter 11 is shown in Fig. 3. The transmitter comprises an ultra high frequency triode vacuum tube 35 which is located approximately in the center of a Lecher wire frame comprising the wires 36 and 37 which provides a circuit of approximately one half wave-length which may be oscillating for example at an average frequency of approximately 450 megacycles. The left-hand end of the frame is by-passed to ground by means of condensers 38 and the right-hand end by means of condensers 39. These two sets of condensers may be adjusted along the rods 36 and 37 to tune the Lecher frame. The lead to the antenna 16 is taken off the Lecher wire 37 through the co-axial line 15 at an appropriate point to effect the maximum energy transfer. As indicated, this point is preferably made adjustable. The variable air condenser 12 is connected between the Lecher frame wires 36 and 37 as indicated.

Condenser 12 is driven by the synchronous motor 13 from a suitable alternating current source 14. In one particular embodiment of the invention for use on aircraft, it was found that a vacuum tube oscillator functions very satisfactorily as the alternating current source 14.

Plate current for the tube 35 is supplied from a battery 40 through the filter 41. Filament heating current is supplied from the battery 42. Since the inductance of the filament lead is sufficiently great to have an effect on the performance of the tube in the frequency range in which it is operated, provision is made for reducing the detrimental effect of this reactance. For this purpose the choke coils 43 are inserted in the filament leads and the by-pass condensers 44 are also provided. The grid of the tube 35 is connected through the left-hand portions of the Lecher frame wire 37 and grid leak resistor 45 to ground.

In the circuit shown the transmitter grid-leak voltage appears on the active end of the antenna 16. If this is found undesirable, a series condenser can be installed in the inner conductor of the coaxial transmission line 15. When this is done it is also desirable to connect a static resistor between the inner conductor of the coaxial line 15 leading to the active end of the antenna 16 and ground to prevent the accumulation of a static charge upon the antenna.

*Detector circuit*

Fig. 4 shows a detailed schematic drawing of the circuit of the detector 20 including the tuning circuit thereof. As referred to in connection with Fig. 1, the signals received in the antenna 17 are brought to the detector through the coaxial transmission line 18. The radio frequency tuning of the detector comprises a two-wire Lecher frame consisting of the parallel wires 46 and 47 which are mounted in a grounded cylinder 49. A piston 50 which is movable by means of the rod and control knob 51 makes electrical contact to the inside of the cylinder 49 and to both of the rods 46 and 47, short-circuiting the rods to the ground furnished by the outer cylinder 49. By sliding the piston 50 along the rod, the Lecher frame may be tuned to resonance.

The antenna circuit which is brought in through the coaxial transmission line 18 is coupled to the tuned circuit by means of the rectangular loop of wire 52 which is arranged with its long side parallel and close to the rods 46 and 47 of the Lecher frame. This loop is adjustable by means of the knob 54 to control the coupling to the Lecher frame. One end of the loop 52 is connected to the inner wire of the coaxial line 18. The other end of the loop is connected to a short length of coaxial transmission line 55 by means of which the loop may be tuned through the adjustment of the short-circuiting piston 56, the position of which along the coaxial line 55 may be controlled by the rod and knob 57.

Detection is attained by use of the diode detector tube 48. The cathode and one side of the filament of this tube are connected to the end of one rod 46 of the Lecher frame and the other side of the filament is connected to an insulated wire which is brought out through the center of the hollow rod 46 to the filament heating battery 53 and ground. The plate of the diode detector tube 48 is connected through a small blocking condenser 58 to the other rod 47 of the Lecher frame. An insulated wire is connected to the plate of the diode 48 and extended down through the center of this hollow rod 47, providing the output terminal 59 of the detector circuit.

*Amplifier and frequency measuring circuit*

Fig. 5 shows a detailed schematic circuit of the amplifier and frequency measuring circuit of the radio receiver portion of the apparatus. This circuit is in general similar to that shown in block schematic on Fig. 1 and the same reference numerals are used for corresponding parts. There are shown three amplifier stages 61, 24 and 62, while in the block schematic of Fig. 1 there is only one stage, namely 24.

As discussed above, the function of this circuit is to amplify the beat frequency output of the detector 20 which comprises waves of frequencies varying between 160 cycles and 40,000 cycles per second and to give an indication of the frequency. The latter function is performed by the frequency meter or counter circuit 25.

When the equipment is operating at higher altitudes, it has been found that there will be present in addition to the difference frequencies representing the altitude, other lower frequencies primarily frequencies produced by amplitude modulation of the echo wave by terrain irregularities but also by amplitude modulation of the transmitter and noise. Unless the effect of such frequencies is eliminated, the frequency meter will not give a true indication of the height. It is therefore necessary to provide means for attenuating frequencies lower than the frequency representing the height. Thus, for example, if the airplane is flying at 5,000 feet and the detector output signal is 40,000 cycles, it is desirable to attenuate frequencies below 40,000 cycles as much as possible. This is accomplished by giving the amplifier a frequency-gain characteristic which rises with frequency. It is possible to do this because the strength of the received echoes at the lower frequencies will be greater than at higher frequencies because they represent shorter paths for the echo transmission.

When the amplifier is given such a sloping frequency-gain characteristic, other difficulties are introduced in the operation of the system at lower altitudes where the difference frequency to be measured is in the lower frequency range. In such cases, the increased amplification at higher frequencies introduces distortion from undesired frequencies which may be either harmonics of the desired signal or signals caused by amplitude modulation of the echo by irregularities of the terrain as the airplane flies therealong. It is consequently necessary to provide means operative in the lower frequency range for limiting the degree of amplification of higher frequencies. This is accomplished by means of an automatically controlled feedback circuit as will be described in detail.

The output of the detector circuit containing the beat frequency wave varying in frequency from 160 cycles to 40,000 cycles is supplied to the amplifier through the connection 59. The main amplifier comprises three stages 61, 24 and 62 employing pentode vacuum tube amplifiers 63, 64 and 65, respectively. The tubes are provided with conventional circuits for supplying screen and anode voltages and are coupled together through resistance-capacity circuits of the usual type. Two series-connected resistors 69.1 and 69.2 shunted by a by-pass condenser 68 are provided in the cathode circuit of tube 63. This circuit provides negative feedback as will be described later. In addition, the direct current voltage drop across resistor 69.1 is used for grid bias, being applied to the grid through the resistance-capacity filter 70—71.

In the input to the first stage 61, there is provided an attenuating network 21 comprising the series condenser 66 and shunt resistor 67 of Fig. 5. The values of this condenser and resistor are so chosen that in combination with the cathode resistors 69.1 and 69.2 and the by-pass condenser 68 of the first amplifier tube 63, the maximum signal transmission occurs at some higher frequency, for example above 20,000 cycles. For each decrease of one octave in frequency below 20,000 cycles approximately 6 decibels additional attenuation of the signal is produced by the action of this network 21 in combination with the negative feedback action of the cathode resistor condenser network.

By utilizing the negative feedback action of the cathode resistor 69.1—69.2 and by-pass condenser 68 in combination with the network 21 instead of the latter alone for obtaining the frequency-gain characteristic of the amplifier, additional discrimination against noise is obtained. The reason for this is that in any multistage amplifier the chief source of circuit noise is the first amplifier stage. Since the negative feedback in the first amplifier tube decreases the gain of that tube at the low frequencies, in which range most of the circuit noise lies, considerable discrimination against such disturbances is obtained.

The output of the tube 63 is connected through a conventional resistance-capacity circuit to the input of the second amplifier tube 64 which is in turn coupled through a similar circuit to the input of the third amplifier tube 65. The circuits for these latter two tubes are so designed that their respective stages provide substantially uniform amplification up to about 40,000 cycles per second. The output of the amplifier tube 65 is connected to the frequency meter circuit 25.

The frequency meter circuit comprises a pentode tube 72, the grid circuit of which is supplied with grid leak resistors 73, 74 and 75. The plate of the tube 72 is connected through a resistor 76, which may be about 20,000 ohms, to the constant voltage source 78. Between the plate and cathode of the tube 72, there is connected through the switch 79 a series circuit consisting of the condenser 80, and a bridge type rectifier 81. A milliammeter 22 is connected across the remaining two terminals of the bridge.

Starting at a time when no signal is applied to the grid of the tube 72, the internal resistance from plate to cathode of the tube is extremely low compared to the resistance of the resistor 76 so the plate is practically the same voltage as the cathode and the condenser 80 is discharged. If there is applied to the grid of tube 72 an alternating current voltage, the negative peak of which is sufficient to cut off the plate circuit, the condenser 80 charges from the battery 78 through resistor 76. Provided the time the tube is blocked is long enough in comparison with the time constant of the condenser and resistance, the condenser 80 will fully charge to the voltage of the battery 78. The circuit is designed for this operation with respect to the currents the frequency of which is to be measured.

During the succeeding positive swing of the excitation applied to the grid of tube 72, the condenser is again discharged to practically zero voltage. Since the action of the rectifier 81 causes both the charging and discharging currents of the condenser to flow through the meter 22 in the same direction, a positive deflection occurs on the meter 22. A frequency of N cycles per second applied to the grid of tube 72 causes a current equal approximately to 2NCE amperes to flow through the meter, where C is capacity of the condenser in farads and E is the plate supply voltage. Thus it will be seen that the rectified current and consequently the meter deflection will be proportional to the frequency of the exciting oscillations applied to the grid of tube 72 and independent of their amplitude.

An auxiliary condenser 82 is provided which may be connected in circuit in place of the condenser 80 by means of the switch 79. This provides means for obtaining a different scale reading on the meter 22. For example, if the condenser 80 were 100 micro-microfarads this combination with a resistance of 20,000 ohms for the resistor 76 would provide a practically linear scale up to 40,000 cycles which corresponds to 5,000 feet. With a capacity for the condenser 82 of 500 micro-microfarads, the time constant of the circuit would be suitable for a maximum frequency of 8,000 cycles which corresponds to 1,000 feet. Thus the use of the switch 79 in connection with the two condenser circuits, permits the use of the full deflection of the meter 22 for two different scale ranges of heights.

The amplifier 26 provides degenerative feedback around the amplifier 24. A pentode tube 85 is used in the amplifier 26 and has its control grid connected to the plate of tube 64 through the blocking condenser 86. The plate of the tube 85 is connected to the input of the tube 64 through the network 23 comprising the blocking condenser 87 and the resistor 88 which is the cathode resistor of tube 64.

The capacity and resistance of the elements of the network 23 are so proportioned that there is provided in the feedback path an attenuation which varies with frequency at the same rate as that provided for the main path amplifier, by the network 21. As a result the feedback can be made to effectively compensate for the sloping characteristic of the main path amplifier and give the over-all amplifier system an amplification characteristic which is constant with frequency. The point at which the feedback amplifier will become effective to produce such a result will depend upon the amount of gain in the feedback path. Since, as discussed above, it is desirable that the amplifier have less gain for frequencies below the frequency representing the height being measured, it is also desirable that the feedback amplifier be only effective to flatten out the over-all gain characteristic for frequencies above the frequency representing the height being measured. In order to accomplish this end, the amplification of the amplifier 26 is controlled in accordance with frequency.

For this purpose there is provided an auxiliary frequency metering circuit 27 which in general design and principle of operation is similar to the main frequency meter circuit 25. This circuit comprises a pentode vacuum tube 90 which has its grid connected in parallel with the grid of the tube 72 through the blocking condenser 91. The grid is connected to the cathode through a grid leak resistor 92 and a negative biasing battery 93. The plate circuit of the tube 90 comprises a resistor 94, connected in series with the plate battery 95 and in parallel therewith from the plate to the cathode, a series circuit comprising a condenser 96, two half wave rectifiers 97 and 98 and the resistor 99.

This circuit operates in the same way as the frequency meter circuit 25 and the rectifiers 97 and 99 are so connected that the voltage drop across the resistor 98 is negative with respect to ground. The negative voltage developed across the resistor 99 plus an additional negative voltage supplied by battery 100 is applied to the control grid of the tube 85 through the resistance capacity filter 101. Since the voltage drop across resistor 99 is proportional to the frequency impressed on the grid of the tube 90, the control bias supplied to the control grid of the tube 85 will also be proportional to frequency. As a result the amount of degenerative feedback provided by the tube 85 is made to decrease with frequency.

The effect of this circuit can be better understood by an examination of the characteristic curves shown in Fig. 6. In this figure, frequency (or feet) are plotted as abscissas against relative response of the over-all amplifier system in decibels as ordinates. The solid line curve 102 represents the characteristic of the amplifier without feedback which is also the characteristic of the amplifier for frequencies above approximately 2,400 cycles per second representing a height of 300 feet at which point the negative bias voltage developed in the resistance 99 is sufficiently high to substantially block the feedback amplifier tube 85. The characteristic at other lower frequencies or heights are represented by the various dotted curves each of which is marked for its corresponding height, for example, 20, 65, 125 feet, etc. It will thus be seen that for these respective heights the effect of the feedback path is to flatten out the over-all characteristic at a point slightly above that representing the particular height. The effect of the decrease in amplification of the feedback path produced by the control circuit 27 as the frequency increases is to raise the point at which the flattening out begins to take effect.

The dotted line characteristic curves are, of course, taken by determining the bias voltage developed across the resistor 99 for the particular height under consideration and applying a corresponding fixed bias voltage to the control grid of the tube 85 for each corresponding curve.

It might be considered that an ideal amplifier would be one which provides full gain at the operating frequency only, attenuating all other frequencies. However, it has been found that under usual operating conditions frequencies higher than the frequencies corresponding to the altitude cause no material difficulty so long as the amplifier gain is not increased more than about 6 to 10 decibels at any frequency above the operating point. These higher undesired frequencies may be either harmonics of the desired signal, signals caused by amplitude modulation of the echo by irregularities of the terrain as the airplane flies therealong, or noise. For these reasons it is necessary to provide the feedback circuit just described to reduce the high frequency gain when flying at low altitudes.

While the performance curves of Fig. 6 meet these practical limitations, it should be understood that they are shown for purposes of illustration only. The more ideal case can be attained or more nearly approached, if desired, by the utilization of the same features herein set forth. Thus the points at which the characteristics flatten off for the various heights may be readily regulated by a proper control of the automatic bias voltage applied to the grid of tube 85. Similarly there may be used a tube 85 having a more remote cut-off than the one used for the system with which the curves of Fig. 6 were obtained. Also, if it is desired to have the gain for higher frequencies reduced rather than leveled off, this may be achieved by changing the slope of the attenuating network. Similarly increased control may be achieved by providing controlled degenerative feedback similar to that provided by amplifier 26 and its control circuits around one or more other amplified stages such as 62.

In addition to measuring the frequency of the beat note to measure the length of the echo path, it may be desirable to observe the pattern of the beat note. This not only provides an observation for determining the operation of the system but will give an indication of the nature of the reflecting surface and consequently of the terrain.

For this purpose there is provided a cathode ray oscillograph 110. The time axis is obtained by supplying one set of plates with the usual sawtooth sweep wave from a source 114 which is synchronized with the transmitter modulating source 14. The other pair of plates are connected to a plug 111. A jack 112 is provided at the output of the detector 20, being connected to the output lead 59 therefrom through the voltage divider 113. A jack 114 is similarly provided at the input of the frequency meter circuit 25 being connected across one of the grid leak resistors 75 of the tube 72.

By plugging the oscillograph plug 111 into either of the jacks 112 or 114 the currents at the corresponding points may be observed.

Figs. 7A, 7B, 7C and 7D show typical oscillograph patterns for different heights and different characteristics of the terrain.

Figure 7A:
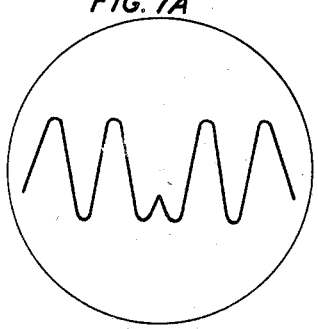
Figs. 7A, 7B, 7C and 7D are typical oscillographs representing the beat frequency currents in the amplifier for different heights and different conditions of the terrain.
Figure 7B:
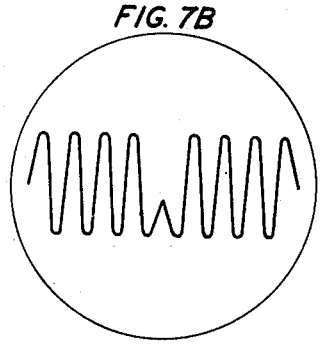

At low altitudes, i. e., short-echo paths, individual cycles of the beat wave may be distinguished, as shown by Figs. 7A and 7B, the latter being the pattern for a height twice as great as that of the former. At greater altitudes with the higher resulting frequencies the individual cycles are not distinguishable and the resultant patterns appear almost solid, as in Figs. 7C and 7D.

Figure 7C:
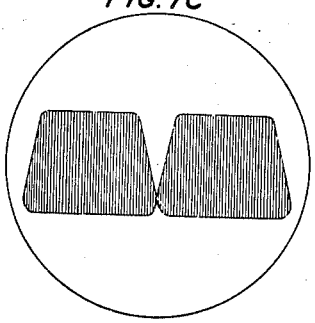
Figure 7D:
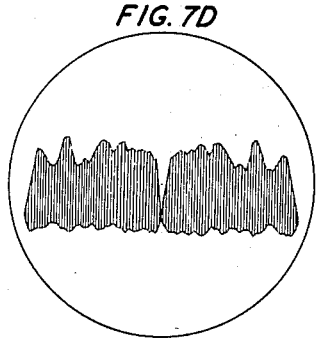

Figs. 7C and 7D are the patterns for approximately the same altitudes but for terrains of different characters. Thus 7C is a typical smooth study pattern such as will be obtained from a calm lake or wide level field. Fig. 7D, on the other hand, shows a type of pattern fluctuating in amplitude as a whole and with a somewhat ragged envelope, as is obtained from a rough surface. Patterns of this general nature are obtained by passing over the built-up sections of a city, rolling country with occasional patches of trees, very rough water, and the like. Heavy timber will give a curiously spotted pattern.

In fact, each type of surface has its own characteristic type of pattern which can be readily recognized with a little practice.

What is claimed is:

1. The method of determining the altitude of an aircraft which includes radiating a wave from the craft toward the earth, cyclically varying the frequency of said wave over a certain range, receiving and combining the radiated wave and the reflected wave at the craft, amplifying the resulting wave, variably discriminating against waves having a frequency higher than that of the resulting wave in accordance with the frequency of the wave being amplified, and measuring the frequency of the resulting wave.

2. In a system for determining the distance between an object and a reflecting surface, a first means at said object for transmitting to said surface a radiant wave having a continuously varying frequency, a second means at said object for simultaneously receiving said wave after reflection from the surface and a wave directly propagated from the first means to the second means, means for obtaining from said waves a current having a frequency representing the distance, means for amplifying said current and regulation means controlled by the frequency of said current for regulating the response of the amplifying means to other frequencies.

3. In combination with a distance determining system including means for receiving a plurality of frequencies and for obtaining a wave having a frequency representing the distance being determined, a first means connected thereto for attenuating frequencies below that of the wave and amplifying said wave, means for measuring the frequency of the amplified wave, means controlled by the first means for obtaining a first voltage having an amplitude representing the first-mentioned frequency, a circuit including a second amplifying means coupled in feedback relation with said first means and means for introducing the said first voltage into the gain control circuit of said second amplifying means to control the feedback action of said second amplifying means at frequencies above that of said distance representing wave.

4. In a system for measuring the distance from an object to a reflecting surface, means at said object for transmitting radiant waves of varying frequency, means at said object for receiving and for combining said waves as received after reflection and said waves as received directly from the transmitting means to produce a beat frequency wave, means for amplifying the beat frequency wave, means including a circuit coupled in degenerative feedback relation with said amplifying means for controlling the response of said amplifying means to limit the amplification at frequencies other than the beat frequency, the response controlling means being automatically regulated in accordance with the beat frequency, and means for measuring the beat frequency.

5. In a system for measuring the altitude of an object above the surface of the earth, a radio transmitter on said object for transmitting waves to the earth, means for cyclically varying the frequency of the waves transmitted thereby, means on said object for receiving said waves after reflection from the earth and simultaneously receiving waves directly from said transmitter, means for combining the reflected waves and the direct waves to produce a beat frequency wave, means for amplifying the beat frequency wave and having a response directly proportional to frequency for at least a portion of the range of frequencies to be amplified, means for obtaining an indication proportional to the frequency of the wave being amplified, a degenerative feedback path operatively coupled to said amplifier and having a transmission characteristic directly proportional to frequency, and means responsive to the frequency of the wave being amplified for controlling the transmission of said feedback path in inverse proportion to the frequency of said wave throughout at least a portion of the range of frequencies to be amplified.

6. A system in accordance with claim 5 in which the last-mentioned means substantially blocks said feedback path for frequencies above a predetermined value.

7. A system in accordance with claim 5 in which the feedback path includes an amplifier.

8. A system in accordance with claim 5 in which the feedback path includes an amplifier having a control grid and the controlling means governs the bias voltage of the control grid.

RICHARD F. LANE.
RUSSELL C. NEWHOUSE.